United States Patent
Chang

(10) Patent No.: US 12,370,944 B2
(45) Date of Patent: Jul. 29, 2025

(54) APPARATUS FOR CONTROLLING VEHICLE AND METHOD THEREOF

(71) Applicants: HYUNDAI MOTOR COMPANY, Seoul (KR); Kia Corporation, Seoul (KR)

(72) Inventor: Kyoung Jin Chang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 79 days.

(21) Appl. No.: 18/388,954

(22) Filed: Nov. 13, 2023

(65) Prior Publication Data

US 2024/0383400 A1    Nov. 21, 2024

(30) Foreign Application Priority Data

May 15, 2023 (KR) ........................ 10-2023-0062644

(51) Int. Cl.
*B60Q 5/00* (2006.01)
(52) U.S. Cl.
CPC .................................. *B60Q 5/008* (2013.01)
(58) Field of Classification Search
None
See application file for complete search history.

(56) References Cited

U.S. PATENT DOCUMENTS

| | | | | |
|---|---|---|---|---|
| 6,391,023 B1 * | 5/2002 | Weber | .................... | A61B 18/24 606/2 |
| 7,494,488 B2 * | 2/2009 | Weber | ................ | A61B 18/1402 606/41 |
| 10,532,738 B2 * | 1/2020 | Yoo | ........................... | B60R 1/12 |
| 11,049,489 B2 | 6/2021 | Jung et al. | | |
| 11,450,209 B2 | 9/2022 | Chang | | |
| 2015/0046046 A1 * | 2/2015 | Muetzel | ................. | G07C 5/008 701/99 |
| 2017/0096099 A1 * | 4/2017 | Matsubara | ....... | G10K 11/17855 |

(Continued)

FOREIGN PATENT DOCUMENTS

| | | |
|---|---|---|
| KR | 10-1535013 B1 | 7/2015 |
| KR | 10-1547938 B1 | 8/2015 |

(Continued)

OTHER PUBLICATIONS

Lee, Gyunjeong, "Research on Objectification of Mescular Stiffness Using Ultrasonic Waves Elasticity Analysis Method", Doctoral Thesis, Jun. 2012.

(Continued)

*Primary Examiner* — Fekadeselassie Girma
(74) *Attorney, Agent, or Firm* — MORGAN, LEWIS & BOCKIUS LLP

(57) ABSTRACT

An apparatus for controlling a vehicle and method thereof includes an air injector that injects air of a preset target pressure to a driver of the vehicle, an ultrasonic transducer that transmits an ultrasonic wave to the driver and receives an echo of the ultrasonic wave, and a processor. The processor is configured to determine a skin stress of the driver based on the target pressure, determine a skin strain of the driver based on the echo, determine a skin stiffness of the driver based on the skin stress and the skin strain, and generate a vehicle sound by use of a volume function generated based on the skin stiffness.

20 Claims, 15 Drawing Sheets

(56) References Cited

U.S. PATENT DOCUMENTS

| | | | | |
|---|---|---|---|---|
| 2019/0071011 A1* | 3/2019 | Konno | | B60Q 5/00 |
| 2020/0193960 A1* | 6/2020 | Jung | | G10K 11/17833 |
| 2021/0407295 A1* | 12/2021 | Chang | | B60W 40/08 |
| 2022/0151980 A1* | 5/2022 | Leo | | A61K 47/06 |
| 2022/0269474 A1* | 8/2022 | Chang | | G06F 3/165 |
| 2024/0383400 A1* | 11/2024 | Chang | | B60Q 5/008 |

FOREIGN PATENT DOCUMENTS

| | | |
|---|---|---|
| KR | 10-1744742 B1 | 6/2017 |
| KR | 10-2006851 B1 | 8/2019 |
| KR | 10-2020-0075144 A | 6/2020 |
| KR | 10-2022-0000654 A | 1/2022 |
| KR | 10-2022-0120741 A | 8/2022 |

OTHER PUBLICATIONS

Jung, Pa Jong, "Basic Knowledge of Ultrasonography and Its Clinical Use", vol. 8, No. 1, Mar. 2008, pp. 1-6.

* cited by examiner

US 12,370,944 B2

APPARATUS FOR CONTROLLING VEHICLE AND METHOD THEREOF

CROSS-REFERENCE TO RELATED APPLICATION

The present application claims priority to Korean Patent Application No. 10-2023-0062644, filed on May 15, 2023, the entire contents of which is incorporated herein for all purposes by this reference.

BACKGROUND OF THE PRESENT DISCLOSURE

Field of the Present Disclosure

The present disclosure relates to an apparatus for controlling a vehicle and method thereof, and more particularly, to a technology for adjusting the sound of a vehicle.

Description of Related Art

Vehicles owned by individuals have increased, and vehicle drivers do not regard a vehicle as simple means of transportation, but tend to feel pleasure through driving. For example, an increasing number of people enjoy speed, such as motorbikes or racing cars, and drivers enjoy the driving sound generated by the engine of a vehicle in addition to the sense of speed. To meet the driver's needs, a technology for outputting a pre-designed driving sound has appeared.

Furthermore, a vehicle may output various warning sounds to the driver according to the vehicle state or the driving state of the vehicle for the driver's safety.

The driving sound for the driver's enjoyment and the warning sound for the driver's safety use a method in which a specific sound source selected from preset sound sources is output.

Therefore, because the physical state of a driver is not reflected in a process of providing a driving sound, there is a limit to providing the driver with an optimal driving sound.

Furthermore, because the physical state of a driver is not reflected in a process of outputting a warning sound, there is a limit to effectively awakening the driver's awareness.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus for controlling a vehicle configured for providing a driving sound optimal to a driver and a method thereof.

Furthermore, another aspect of the present disclosure provides an apparatus for controlling a vehicle configured for making a driver feel more alert and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle includes an air injector that injects air of a preset target pressure to a driver of the vehicle, an ultrasonic transducer that transmits an ultrasonic wave to the driver and receives an echo of the ultrasonic wave, and a processor which is configured to determine a skin stress of the driver based on the target pressure, to determine a skin strain of the driver based on the echo, to determine a skin stiffness of the driver based on the skin stress and the skin strain, and to generate a vehicle sound by use of a volume function generated based on the skin stiffness.

According to an exemplary embodiment of the present disclosure, the processor is configured to determine a measured elastic modulus based on the skin stress and the skin strain, and determine the skin stiffness based on the measured elastic modulus and a previously obtained reference elastic modulus.

According to an exemplary embodiment of the present disclosure, the processor is configured to generate a volume function for determining a virtual engine sound based on driving information including at least one of revolutions per minute (RPM) of an engine, a torque of the engine, a vehicle speed, or an accelerator pedal opening amount and the skin stiffness.

According to an exemplary embodiment of the present disclosure, the processor is configured to generate a first volume function for determining a volume according to the revolutions per minute (RPM) of the engine based on the RPM of the engine and the skin stiffness.

According to an exemplary embodiment of the present disclosure, the processor is configured to generate a second volume function for determining an overall volume of the virtual engine sound based on at least one piece of information selected among the vehicle speed, the torque, and the accelerator pedal opening amount and the skin stiffness.

According to an exemplary embodiment of the present disclosure, the processor is configured to generate a volume function for determining a virtual motor sound based on driving information including at least one of RPM of a driving motor, a torque of the driving motor, a vehicle speed, and an accelerator pedal opening amount and the skin stiffness.

According to an exemplary embodiment of the present disclosure, the processor is configured to generate a third volume function for adjusting a pitch ratio of the virtual motor sound based on the RPM of the driving motor and the skin stiffness.

According to an exemplary embodiment of the present disclosure, the processor is configured to generate a fourth volume function for adjusting volume of each RPM section of the virtual motor sound based on the RPM of the driving motor and the skin stiffness.

According to an exemplary embodiment of the present disclosure, the processor is configured to generate a fifth volume function for determining an overall volume of the virtual motor sound based on at least one piece of information selected among the vehicle speed, the torque, or the accelerator pedal opening amount and the skin stiffness.

According to an exemplary embodiment of the present disclosure, the processor is configured to generate an electric component sound volume function for generating electric component sound based on the skin stiffness.

According to another aspect of the present disclosure, a method of controlling a vehicle includes determining skin stiffness of a driver based on skin stress of the driver and a skin strain obtained based on an echo reflected by transmitting an ultrasonic wave to the driver, generating a volume function in which at least one of a volume, a frequency, or waveform shape is set differently based on the skin stiffness, and generating a vehicle sound based on the volume function.

According to an exemplary embodiment of the present disclosure, the determining of the skin stiffness may include determining the skin strain by injecting air of a preset target pressure to the driver, transmitting the ultrasonic wave to the driver to determine the skin strain based on the echo of the returned ultrasonic wave, determining a measured elastic modulus based on the skin stress and the skin strain, and determining a skin stiffness based on the measured elastic modulus and a previously obtained reference elastic modulus.

According to an exemplary embodiment of the present disclosure, the method may further include obtaining driving information including at least one of revolutions per minute (RPM) of an engine, a torque of the engine, a vehicle speed, or an accelerator pedal opening amount, wherein the generating of the volume function includes generating a volume function for determining a virtual engine sound based on the driving information and the skin stiffness.

According to an exemplary embodiment of the present disclosure, the generating of the volume function may include generating a first volume function for determining a volume according to the RPM of the engine based on the RPM of the engine and the skin stiffness.

According to an exemplary embodiment of the present disclosure, the generating of the volume function may include generating a second volume function for determining an overall volume of the virtual engine sound based on at least one piece of information selected among the vehicle speed, the torque, and the accelerator pedal opening amount and the skin stiffness.

According to an exemplary embodiment of the present disclosure, the method may further include obtaining driving information including at least one of RPM of a driving motor, a torque of the driving motor, a vehicle speed, and an accelerator pedal opening amount, wherein the generating of the volume function includes generating a volume function for determining a virtual motor sound based on the driving information and the skin stiffness.

According to an exemplary embodiment of the present disclosure, the generating of the volume function may include generating a third volume function for adjusting a pitch ratio of the virtual motor sound based on the RPM of the driving motor and the skin stiffness.

According to an exemplary embodiment of the present disclosure, the generating of the volume function may include generating a fourth volume function for adjusting volume of each RPM section of the virtual motor sound based on the RPM of the driving motor and the skin stiffness.

According to an exemplary embodiment of the present disclosure, the generating of the volume function may include generating a fifth volume function for determining an overall volume of the virtual motor sound based on at least one piece of information selected among the vehicle speed, the torque, or the accelerator pedal opening amount and the skin stiffness.

According to an exemplary embodiment of the present disclosure, the generating of the vehicle sound may include generating an electric component sound volume function for generating electric component sound based on the skin stiffness.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
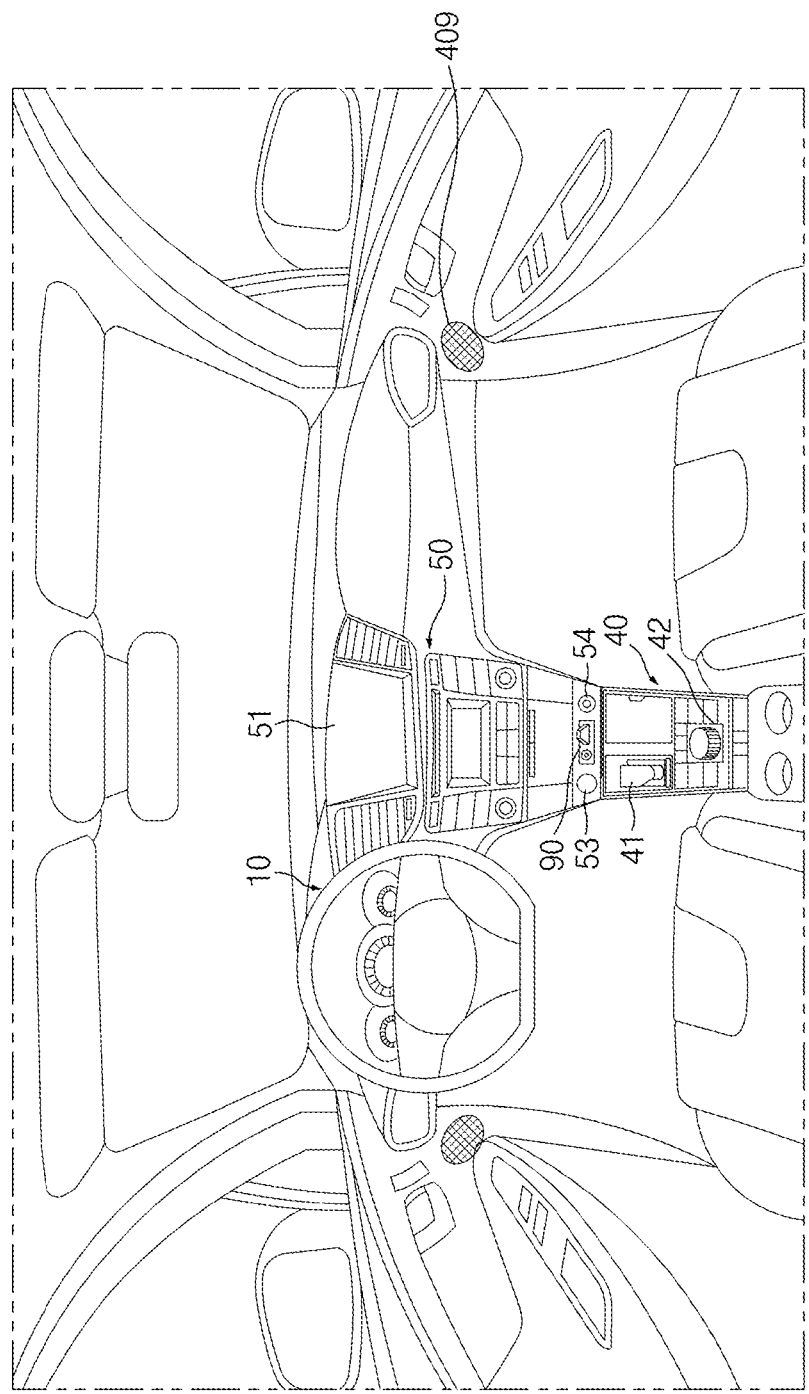
FIG. 1 is a diagram illustrating the interior of a vehicle provided with an apparatus for controlling a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein include the same meaning as commonly understood by one of ordinary skill in the art to which the present disclosure belongs. It will be further understood that terms, such as those defined in commonly used dictionaries, should be interpreted as including a meaning which is consistent with their meaning in the context of the relevant art and will not be interpreted in an idealized or overly formal sense unless so defined herein.

Hereinafter, with reference to FIGS. 1 to 15, various exemplary embodiments of the present disclosure will be described in detail.

Figure 2:
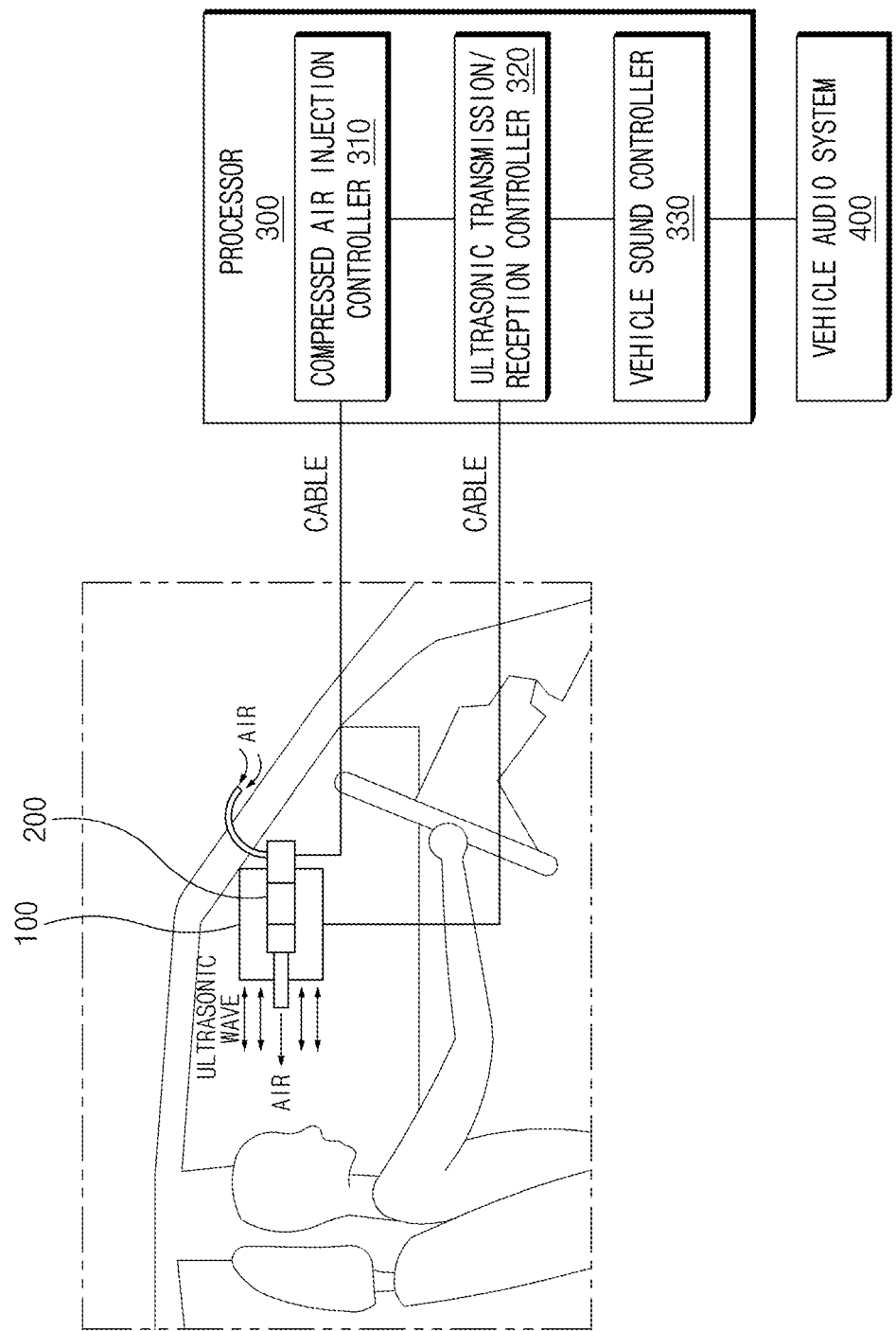
FIG. 2 is a diagram illustrating the main configuration of an apparatus for controlling a vehicle.

FIG. 1 is a diagram illustrating the interior of a vehicle provided with an apparatus for controlling a vehicle according to an exemplary embodiment of the present disclosure. FIG. 2 is a diagram illustrating the main configuration of an apparatus for controlling a vehicle.

Referring to FIG. 1 and FIG. 2, according to an exemplary embodiment of the present disclosure, a vehicle may include a dashboard, skin stiffness determination modules 100 and 200, a processor 300, and a speaker 409.

A gear box 40, a center fascia 50, a steering wheel 10, and the like may be disposed on the dashboard. The gear box 40 may provide a space in which a shift gear 41 for shifting a gear ratio of a vehicle and a dial controller 42 for manipulating a multimedia device are provided. The center fascia 50 may include an air outlet, a watch, a display 51, and the like. The air outlet may allow air to flow into the interior of the vehicle under control of the air conditioner, controlling the temperature, humidity, and cleanliness of air inside the vehicle. Furthermore, the dashboard may include a USB port 90 for connecting an Audio, Video and Navigation (AVN) device and a storage medium.

The skin stiffness determination modules 100 and 200 may be located on a ceiling inside a vehicle or arranged on the dashboard to transmit air and an ultrasonic wave toward the driver's face. To the present end, the skin stiffness determination modules 100 and 200 may include the ultrasonic transducer 100 that emits an ultrasonic wave toward the driver's face and the air injector 200 that injects air at a target pressure toward the driver's face during a short time.

The processor 300 may be configured to determine the skin stress of the driver based on the target pressure of the air emitted by the air injector 200. Furthermore, the processor 300 may be configured to determine the skin strain of the driver based on the echo of the ultrasonic wave received by the ultrasonic transducer 100. The processor 300 may be configured to determine the skin stiffness of the driver based on skin stress and skin strain. Furthermore, the processor 300 may be configured to generate a volume function based on the skin stiffness, and may be configured to generate a vehicle sound by use of the volume function.

The speaker 409 may output the vehicle sound generated by the processor 300.

Hereinafter, an apparatus for controlling a vehicle according to an exemplary embodiment of the present disclosure will be described in more detail.

Figure 3A:
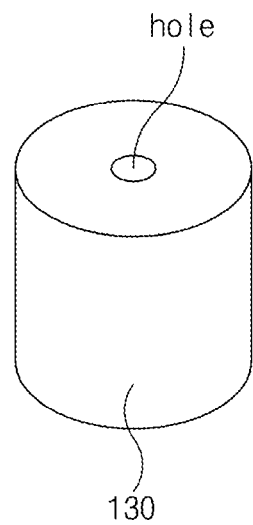
FIG. 3A, FIG. 3B and FIG. 3C are diagrams illustrating an ultrasonic transducer according to an exemplary embodiment of the present disclosure.
Figure 3B:
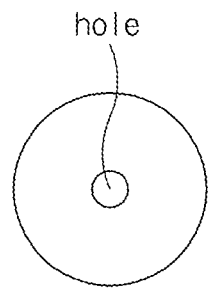
Figure 3C:
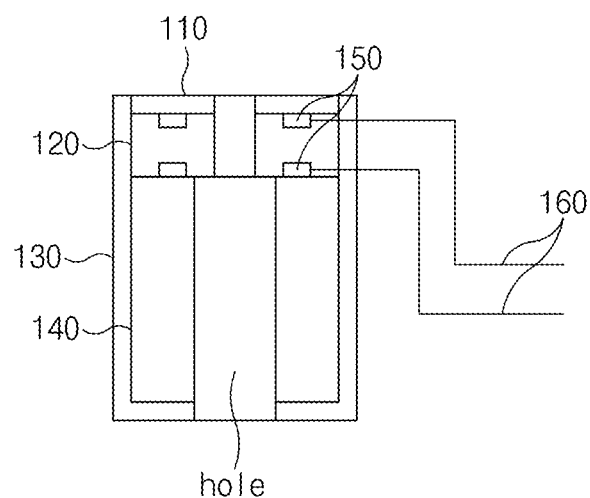

FIG. 3A, FIG. 3B and FIG. 3C are diagrams illustrating an ultrasonic transducer according to an exemplary embodiment of the present disclosure. FIG. 3A is a diagram illustrating the appearance of a frame of an ultrasonic transducer, FIG. 3B is a top-view of the ultrasonic transducer, and FIG. 3C is a cross-sectional view of the ultrasonic transducer.

Referring to FIG. 3A, FIG. 3B and FIG. 3C, the ultrasonic transducer 100 may include a cover 110, a piezoelectric element 120, a housing 130, a sound absorbing material 140, an electrode portion 150, and a first cable 160.

The cover 110 may be formed to surround the piezoelectric element 120 to protect the piezoelectric element 120.

The piezoelectric element 120 may convert mechanical stress into electric charge or may be deformed by a voltage applied from the electrode portion 150 to generate a vibration. The piezoelectric element 120 may be configured to generate an ultrasonic wave through vibration, and may receive an echo of the ultrasonic wave to convert it into an electric current. The piezoelectric element 120 may be connected to an ultrasonic transmission/reception controller 320 through the first cable 160.

The housing 130 may provide a space in which the piezoelectric element 120 and the sound absorbing material 140 are accommodated. A hole through which the air injector 200 may pass may be provided inside the housing 130.

The sound absorbing material 140 may increase ultrasonic dust collection performance.

The electrode portion 150 may include a pair of electrodes for applying a voltage to the piezoelectric element 120 so that the piezoelectric element vibrates.

Figure 4:
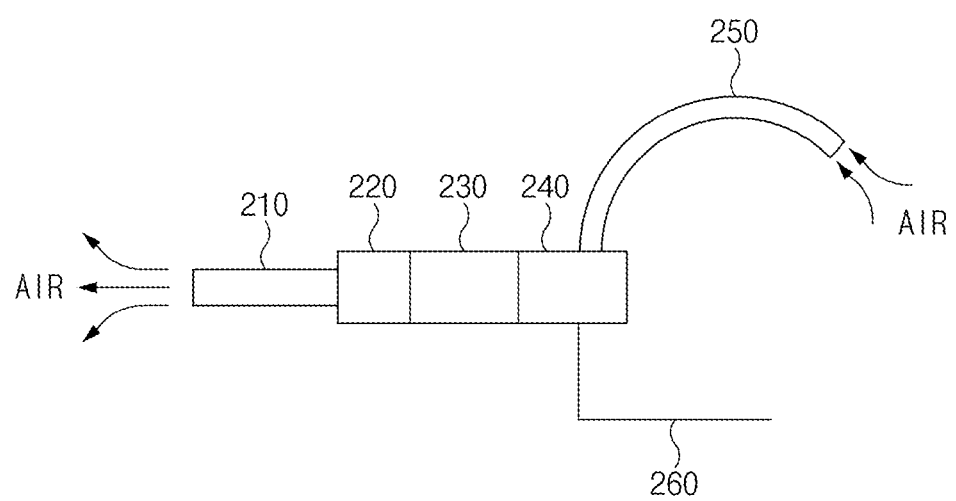
FIG. 4 is a diagram illustrating an air injector according to an exemplary embodiment of the present disclosure.

FIG. 4 is a diagram illustrating an air injector according to an exemplary embodiment of the present disclosure.

Referring to FIG. 4, the air injector 200 according to an exemplary embodiment of the present disclosure may include a nozzle 210, a valve 220, compressed air storage 230, an air pump 240, and a tube 250.

The nozzle 210 may provide a passage through which high-pressure air is injected, and the diameter of the nozzle 210 may be determined based on the speed of the compressed air.

The valve 220 may instantaneously open the compressed air storage 230 to inject air, and may be implemented as a solenoid valve which is opened or closed by ON/OFF control.

The compressed air storage 230 may provide a space in which air compressed by the air pump 240 is stored.

The air pump 240 may draw air in the atmosphere through the tube 250 and compress the drawn air. The air pump 240 may be implemented using a compressor such as a diaphragm air pump, a rotary compressor, a screw compressor, a centrifugal compressor, or the like. The inlet of the tube 250 may be placed inside or outside the vehicle. Furthermore, the air pump 240 may draw in outside air through the inlet without using the tube 250. The air pump 240 may be connected to a compressed air injection controller 310 through the second cable 260.

Figure 5:
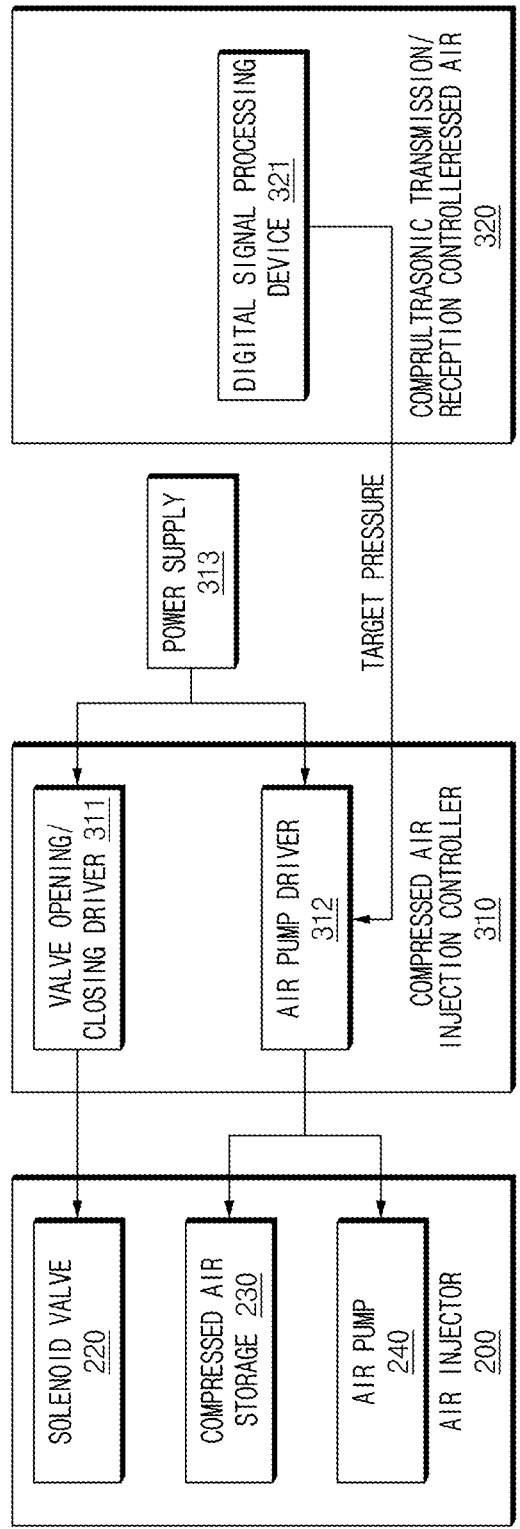
FIG. 5 is a diagram illustrating the configuration of a compressed air injection controller according to an exemplary embodiment of the present disclosure.
Figure 6:
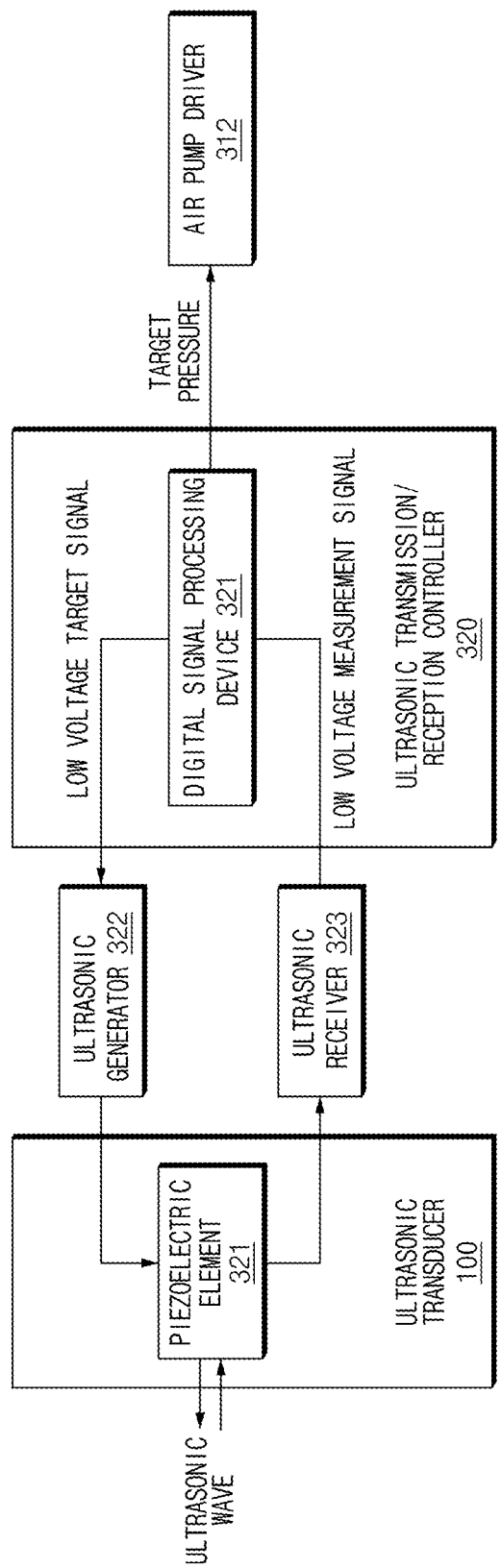
FIG. 6 is a diagram illustrating the configuration of an ultrasonic transmission/reception controller according to an exemplary embodiment of the present disclosure.
Figure 7:
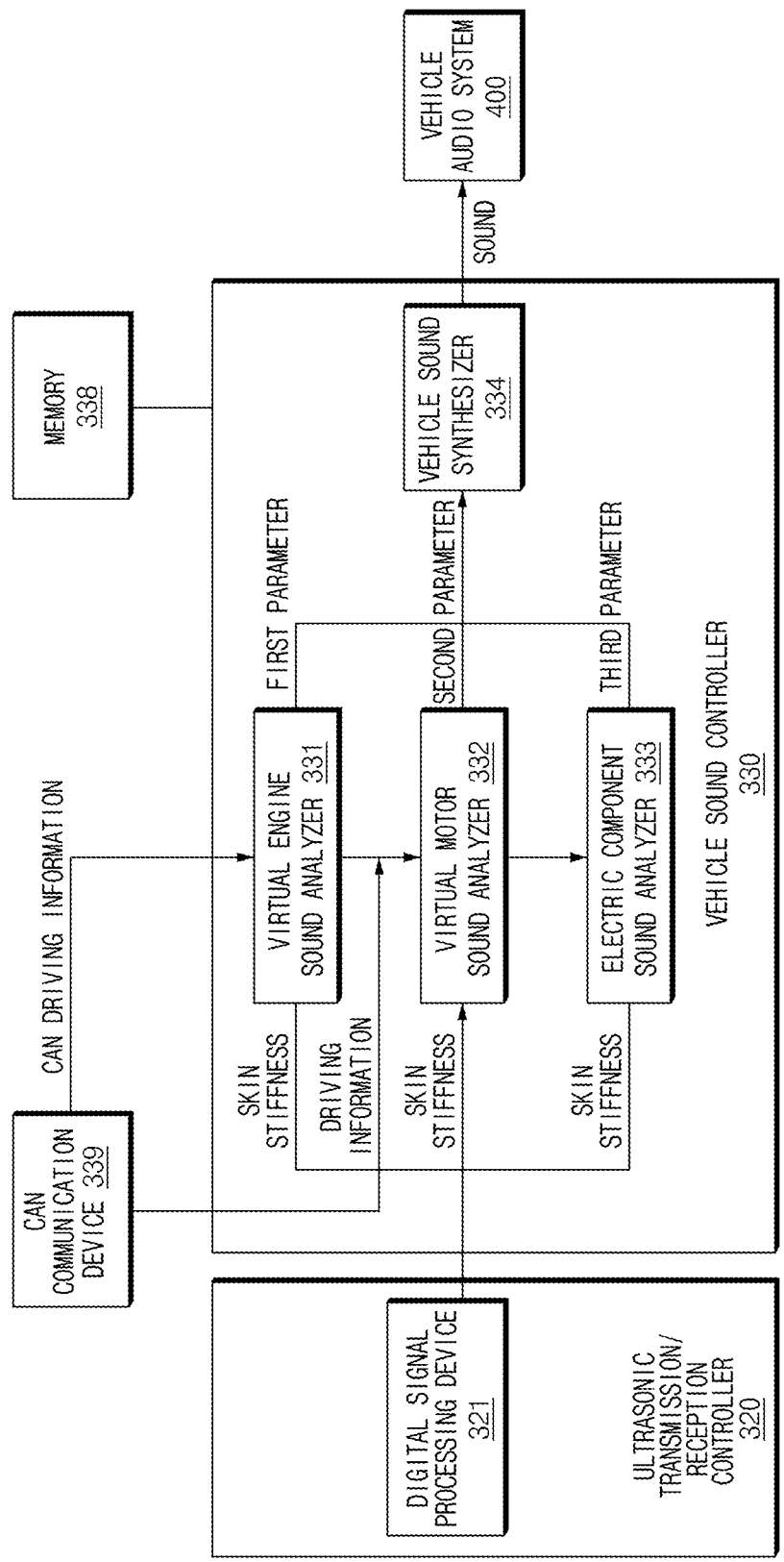
FIG. 7 is a diagram illustrating the configuration of a vehicle sound controller according to an exemplary embodiment of the present disclosure.

FIG. 5, FIG. 6 and FIG. 7 are diagrams illustrating the configuration of a processor according to an exemplary embodiment of the present disclosure. Components shown in FIG. 5, FIG. 6 and FIG. 7 may not be physically separated and FIG. 5, FIG. 6 and FIG. 7 may be diagrams illustrating features operated by one processor.

FIG. 5 is a diagram illustrating the configuration of a compressed air injection controller according to an exemplary embodiment of the present disclosure.

Referring to FIG. 5, the compressed air injection controller according to an exemplary embodiment of the present disclosure may use a signal from a digital signal processing device 321 of the ultrasonic transmission/reception controller 320, and may output a current for controlling the compressed air injector 200 based on the power of a power supply 313. To the present end, the compressed air injection controller 310 may include a valve opening/closing driver 311 and an air pump driver 312.

The valve opening/closing driver 311 may output a signal for controlling the valve 220 according to a user input or at preset operation timing.

The air pump driver 312 may output a signal for controlling the compressed air storage 230 and the air pump 240 according to a user input or at preset operation timing. The air pump driver 312 may stop the operation of the air pump 240 when the pressure of the compressed air storage 230 receiving compressed air from the air pump 240 reaches a preset target pressure. The target pressure may be determined by the digital signal processing device 321.

FIG. 6 is a diagram illustrating the configuration of an ultrasonic transmission/reception controller according to an exemplary embodiment of the present disclosure.

Referring to FIG. 6, the ultrasonic transmission/reception controller 320 according to an exemplary embodiment of the present disclosure may include the digital signal processing device 321 for controlling an ultrasonic generator 322 and an ultrasonic receiver 323.

The ultrasonic generator 322 may be configured to generate a pulse in an ultrasonic frequency band by boosting a low voltage signal output from the digital signal processing device 321.

The ultrasonic receiver 323 may receive the current generated by the piezoelectric element 120 due to the echo of the ultrasonic wave, amplify the received current, reduce the voltage, and filter it to obtain the signal in a target frequency band by use of a frequency filter. The ultrasonic receiver 323 may output the filtered signal to the digital signal processing device 321.

The digital signal processing device 321 may output a target signal in an ultrasonic frequency band and receive an echo returned by reflecting the ultrasonic wave to determine the driver's skin strain. Furthermore, the digital signal processing device 321 may be configured to determine skin stress based on the target pressure applied to the air pump driver 312. Furthermore, the digital signal processing device 321 may be configured to determine the elastic modulus based on the skin stress and skin strain, and determine the skin stiffness based on a reference elastic modulus and the measured elastic modulus. The reference elastic modulus, which is pre-determined, may be an average value of elastic moduli obtained several times in a calm state of the driver. The measured elastic modulus may be an elastic modulus determined based on the skin stress and skin strain measured at a timing to control the vehicle sound based on driver's fatigue.

FIG. 7 is a diagram illustrating the configuration of a vehicle sound controller according to an exemplary embodiment of the present disclosure.

Referring to FIG. 7, a vehicle sound controller according to an exemplary embodiment of the present disclosure may include a virtual engine sound analyzer 331, a virtual motor sound analyzer 332, an electric component sound analyzer 333, and a vehicle sound synthesizer 334 to generate a vehicle sound by adjusting parameters of a volume function stored in a memory 338 based on driving information provided from a CAN communication device 339. The memory 338 may include an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

When the vehicle is an internal combustion engine vehicle, the virtual engine sound analyzer 331 may be configured to generate a first tuning parameter based on the skin stiffness and the driving information of at least one of engine revolutions per minute (RPM), an engine torque, a vehicle speed or an accelerator pedal opening amount.

When the vehicle is an electric vehicle, the virtual motor sound analyzer 332 may be configured to generate a second tuning parameter based on the skin stiffness and the driving information of at least one of a motor RPM, a motor torque, a vehicle speed, and an accelerator pedal opening amount.

The electric component sound analyzer 333 may be configured to generate a third tuning parameter based on the skin stiffness.

The vehicle sound synthesizer 334 may be configured to generate a virtual engine sound based on the first parameter. For example, the vehicle sound synthesizer 334 may be configured to generate a virtual engine sound by adjusting a preset variable of the volume function based on the first parameter.

The vehicle sound synthesizer 334 may be configured to generate a virtual motor sound based on the second parameter. For example, the vehicle sound synthesizer 334 may be configured to generate a virtual motor sound by adjusting a preset variable of the volume function based on the second parameter.

The vehicle sound synthesizer 334 may be configured to generate an electric component sound based on the third parameter. The electric component sound may include a horn sound, a seat belt warning sound, a direction signal sound, and the like. Hereinafter, a method of controlling a vehicle for generating a vehicle sound according to an exemplary embodiment of the present disclosure will be described.

Figure 8:
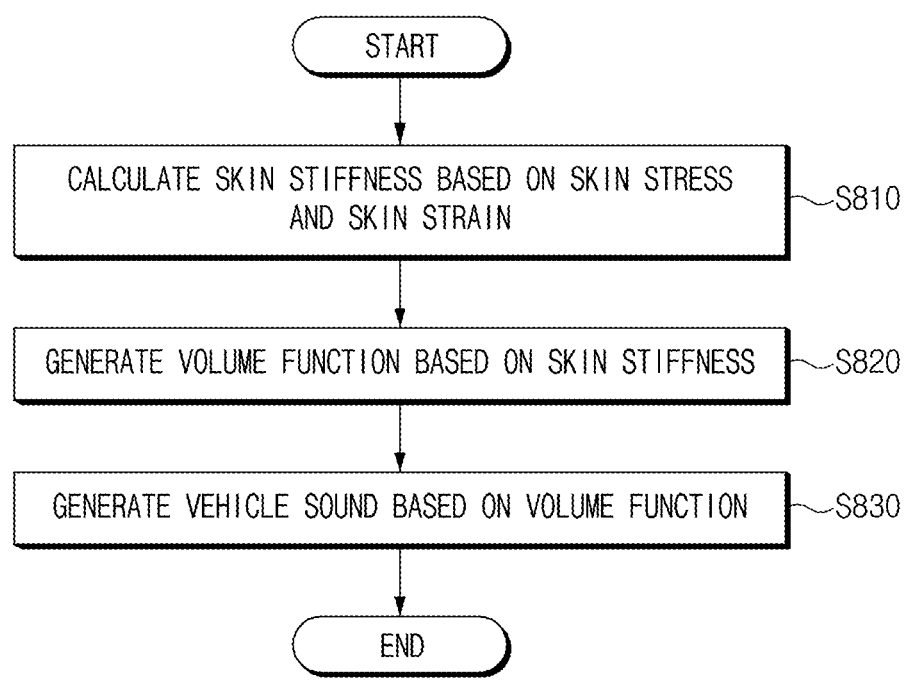
FIG. 8 is a diagram illustrating a vehicle control method according to an exemplary embodiment of the present disclosure.

FIG. 8 is a diagram illustrating a vehicle control method according to an exemplary embodiment of the present disclosure.

With reference to FIG. 8, a method of controlling a vehicle according to an exemplary embodiment of the present disclosure will be described below.

In S810, the processor 300 may be configured to determine skin stress and skin strain, and determine skin stiffness based on the skin stress and skin strain.

The processor 300 may inject air at a preset target pressure through the air injector 200 to determine the skin stress. When the target pressure is in contact with the driver's skin, the skin stress σ may be determined as an amount of "Fa/A", where 'Fa' may mean the force applied to the skin by the compressed air. 'Fa' may be determined as an amount of "P$\pi$r$^2$", and 'P' may be a target pressure of air discharged from the air injector 200. 'A' may mean an area where compressed air comes into contact with the skin, and may be determined through the radius (r) of the nozzle 210 and the distance between the nozzle 210 and the driver. The distance between the nozzle 210 and the driver may be experimentally estimated and may be determined based on a captured image of the driver.

The processor 300 may be configured to determine the skin strain ε based on the echo of the ultrasonic wave reflected by the driver. The processor 300 may measure the time delay of the echo and measure the strain based on the time delay of the echo.

The processor 300 may be configured to determine the amount of "σ/ε" as an elastic modulus E.

Figure 9:
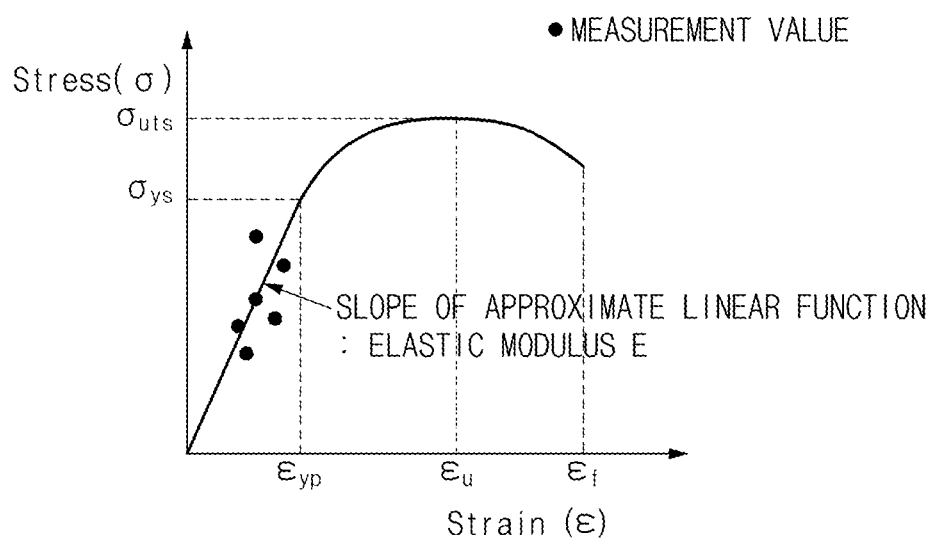
FIG. 9 is a schematic diagram illustrating a method of obtaining an elastic modulus.

FIG. 9 is a schematic diagram illustrating a method of obtaining an elastic modulus.

As shown in FIG. 9, to determine the elastic modulus E, the processor 300 may be configured to determine the average value by determining "σ/ε" several times, and the determination result may correspond to the slope of the linearized graph representing the skin stress σ according to the skin strain ε. In FIG. 9, $\varepsilon_{yp}$ may be a yield displacement, $\varepsilon_u$ may be a tensile displacement, $\varepsilon_f$ may be a breaking displacement, $\sigma_{ys}$ may be a yield strength, and $\sigma_{ut}$ may be a tension strength.

Furthermore, the processor 300 may be configured to determine a skin stiffness SS by use of the elastic modulus E and a reference elastic modulus E_r. The reference elastic modulus E_r, which is preset, may be an average value of several elastic moduli. In a process of obtaining the reference elastic modulus E_r, the method of obtaining each elastic modulus may be the same as the method of obtaining the elastic modulus E described above. That is, the reference elastic modulus E_r and the elastic modulus E may be distinguished by a difference in determined timing, and the reference elastic modulus E_r may be obtained when the driver is in a calm state.

The processor 300 may use a preset stiffness determination function to determine the skin stiffness SS. The stiffness determination function may be set based on a result of regression analysis of a correlation between the elastic modulus E and the skin stiffness. The stiffness determination function may be set to determine skin stiffness of a large value in proportion to the magnitude of the elastic modulus E.

In S820, the processor 300 may be configured to generate a volume function based on the skin stiffness.

The volume function, which is to generate a vehicle sound, may vary according to the type of vehicle sound. For example, the vehicle sound may be classified into a virtual engine sound, a virtual motor sound, and an electric component sound, and accordingly, the volume function may include a volume function for generating a virtual engine sound, a volume function for generating a virtual motor sound, and a volume function for generating an electric component sound.

In S830, the processor 300 may be configured to generate the vehicle sound based on the skin stiffness and driving information.

One vehicle sound may be generated by synthesizing a plurality of volume functions. For example, the volume function may include volume functions for adjusting the volume, frequency, shape of a waveform, and size of a specific section of a vehicle sound.

Furthermore, the processor 300 may output a vehicle sound through a speaker.

Hereinafter, a more specific example of a method of controlling a vehicle for generating a vehicle sound will be described.

Figure 10:
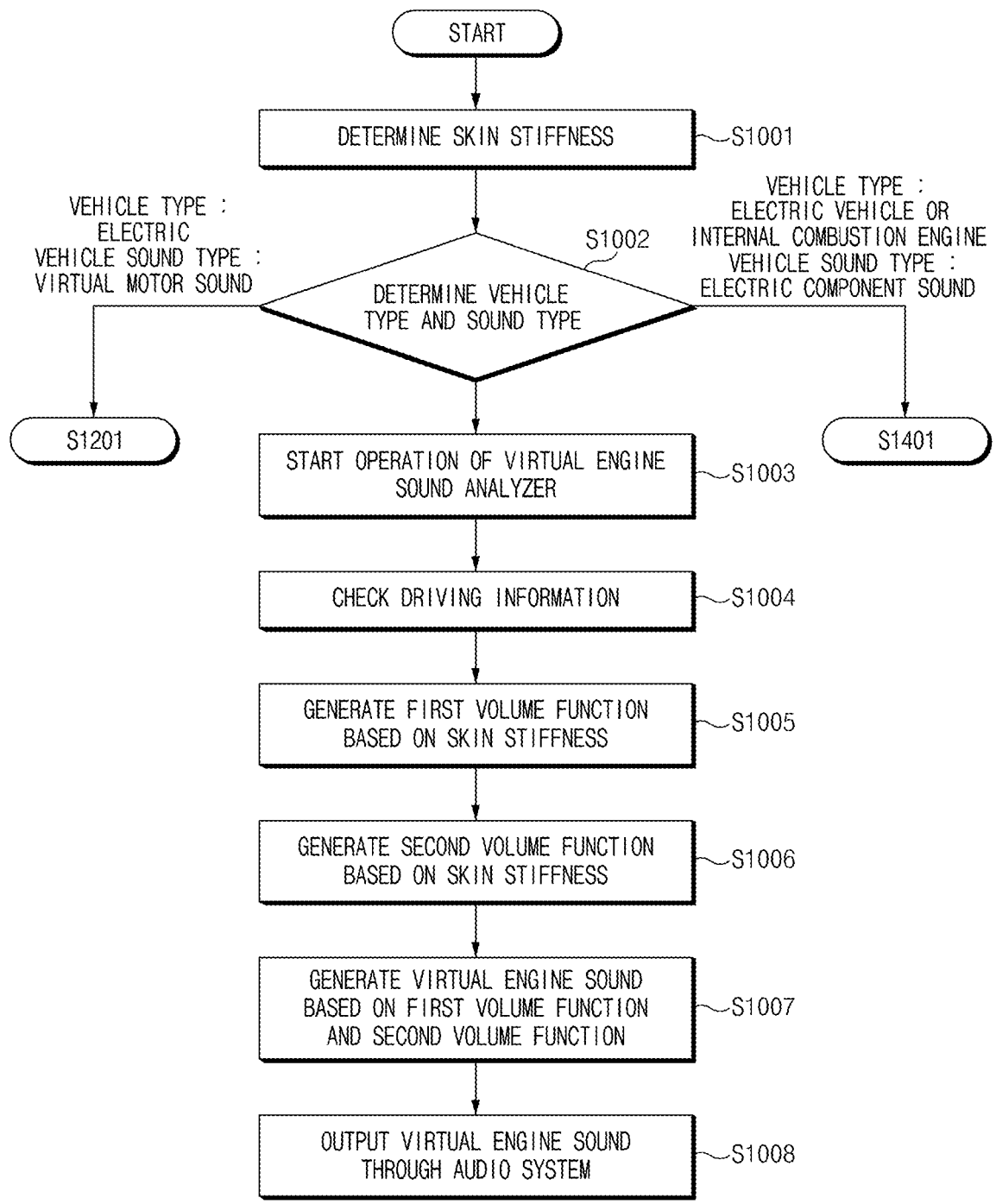
FIG. 10 is a diagram illustrating a method of controlling a vehicle according to another exemplary embodiment of the present disclosure.

FIG. 10 is a diagram illustrating a method of controlling a vehicle according to another exemplary embodiment of the present disclosure. FIG. 10 illustrates a process of outputting a vehicle sound of a virtual engine sound.

With reference to FIG. 10, a method of controlling a vehicle according to another exemplary embodiment of the present disclosure will be described below.

In S1001, the processor 300 may be configured to determine skin stiffness.

The processor 300 may be configured to determine the skin stiffness by use of the procedure of S810.

In S1002, the processor 300 may be configured to determine the type of vehicle and the type of sound. For example, the processor 200 may receive predetermined a data for the type of vehicle and the type of sound from the memory 338.

In S1003, when the vehicle is an internal combustion engine vehicle and a virtual engine sound is to be output, the processor 300 may start the operation of the virtual engine sound analyzer 331.

Alternatively, when the vehicle is an electric vehicle and a virtual motor sound is to be output, the processor 300 may enter operation S1201, which will be described later with reference to FIG. 12.

Alternatively, when it is desired to output electric component sound regardless of the type of vehicle, the processor 300 may enter operation S1401, which will be described later with reference to FIG. 14.

In S1004, the processor 300 may check driving information.

The processor 300 may obtain driving information including at least one of the engine RPM, engine torque, vehicle speed, and accelerator pedal opening amount through the CAN communication device 339.

In S1005, the processor 300 may be configured to generate the first volume function based on the skin stiffness.

The first volume function, which is to determine the volume according to the engine RPM, may be generated by synthesizing a plurality of engine order-specific functions.

Figure 11A:
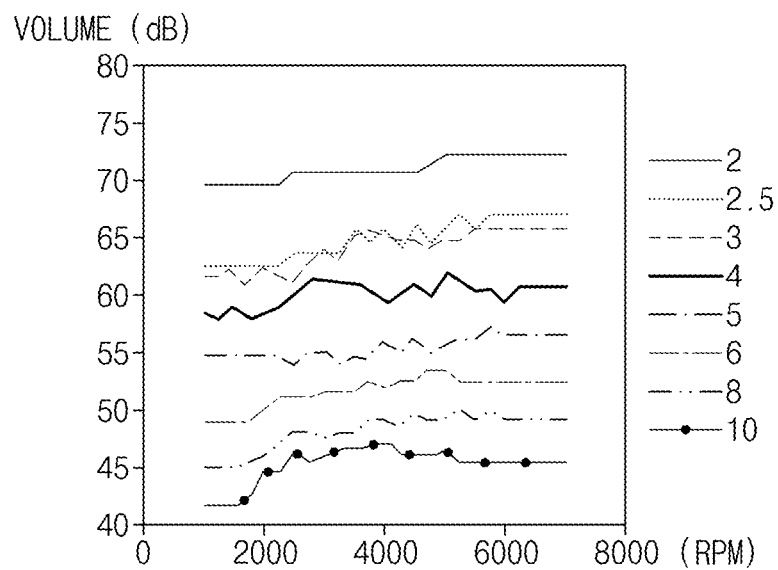
FIG. 11A and FIG. 11B are diagrams illustrating an example of a volume function for each engine order.
Figure 11B:
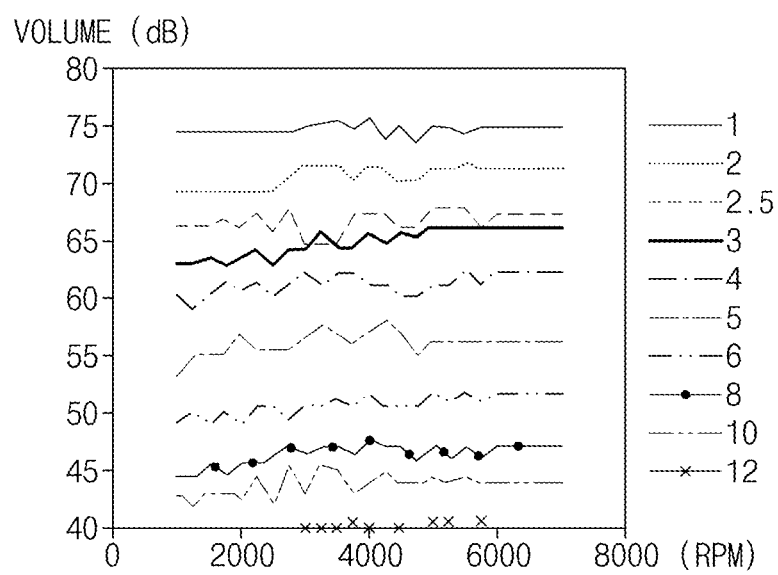

FIG. 11A and FIG. 11B are diagrams illustrating an example of a volume function for each engine order. FIG. 11A is a diagram illustrating eight engine order-specific functions which determine the first volume function of an arbitrary vehicle. FIG. 11B is a diagram illustrating ten engine order-specific functions which determine the first volume function of another arbitrary vehicle. In FIG. 11, the horizontal axis means RPM, and the vertical axis means volume (dB).

Each engine order-specific function may be defined as a volume corresponding to engine RPM, and may be configured to determine a timbre or tone of a virtual engine sound. For example, relatively low-order functions may be implemented to represent low-frequency tones, and higher-order functions may be implemented to represent high-frequency tones. The frequency (Hz) of sound according to the engine order may be determined by (RPM/60)×(engine order). For example, the second engine component at 6000 rpm may be determined to be 200 Hz, and the sixth engine component at 6000 rpm may be determined to be 600 Hz.

The first volume function may be generated by synthesizing $2^{nd}$ order, $2.5^{th}$ order, $3^{th}$ order, $4^{th}$ order, $5^{th}$ order, $6^{th}$ order, 8th order, and 10th order functions as shown in FIG. 11A. Alternatively, the first volume function may be generated by synthesizing 1st order, 2nd, 2.5th other, 3th order, 4th order, 5th order, 6th order, 8th order, 10th order, and 12th order functions as shown in FIG. 11B.

The generating of the first volume function may include adjusting a parameter of the volume function for each engine order according to driving information or skin stiffness.

The processor 300 may set a volume function for each engine order so that the volume increases when the accelerator pedal opening amount increases. For example, when the accelerator pedal opening amount is 0%~30%, the volume of the basic level may be set. When the accelerator pedal opening amount is 30%~70%, the volume may increase by 2 dB from the basic level. When the accelerator pedal opening amount is 70%~100%, the volume may increase by 4 dB from the basic level.

The processor 300 may set a volume function for each engine order so that the volume increases according to the vehicle speed. For example, when the vehicle speed is 0 to 50 kph, the basic level of volume may be set, and when the vehicle speed is 50 kph or more, the basic level of volume may be increased by 3 dB.

Furthermore, the processor 300 may set the volume function for each engine order so that the slope of volume increases according to the skin stiffness. For example, the volume function for each engine order may be set so that the slope of the volume increases by 10% whenever the magnitude of skin stiffness increases by 20%.

In S1006, the processor 300 may be configured to generate the second volume function based on the skin stiffness.

The second volume function may be configured to determine the overall volume of the virtual engine sound. The processor 300 may be configured to generate the second volume function so that the total volume increases in proportion to the skin stiffness. The basic level of the overall volume may be set based on at least one of the vehicle speed, torque, and the accelerator pedal opening amount, and the basic level may be adjusted according to the skin stiffness.

In S1007, the processor 300 may be configured to generate a virtual engine sound based on the first volume function and the second volume function.

In S1008, the processor 300 may output the virtual engine sound through a speaker.

Figure 12:
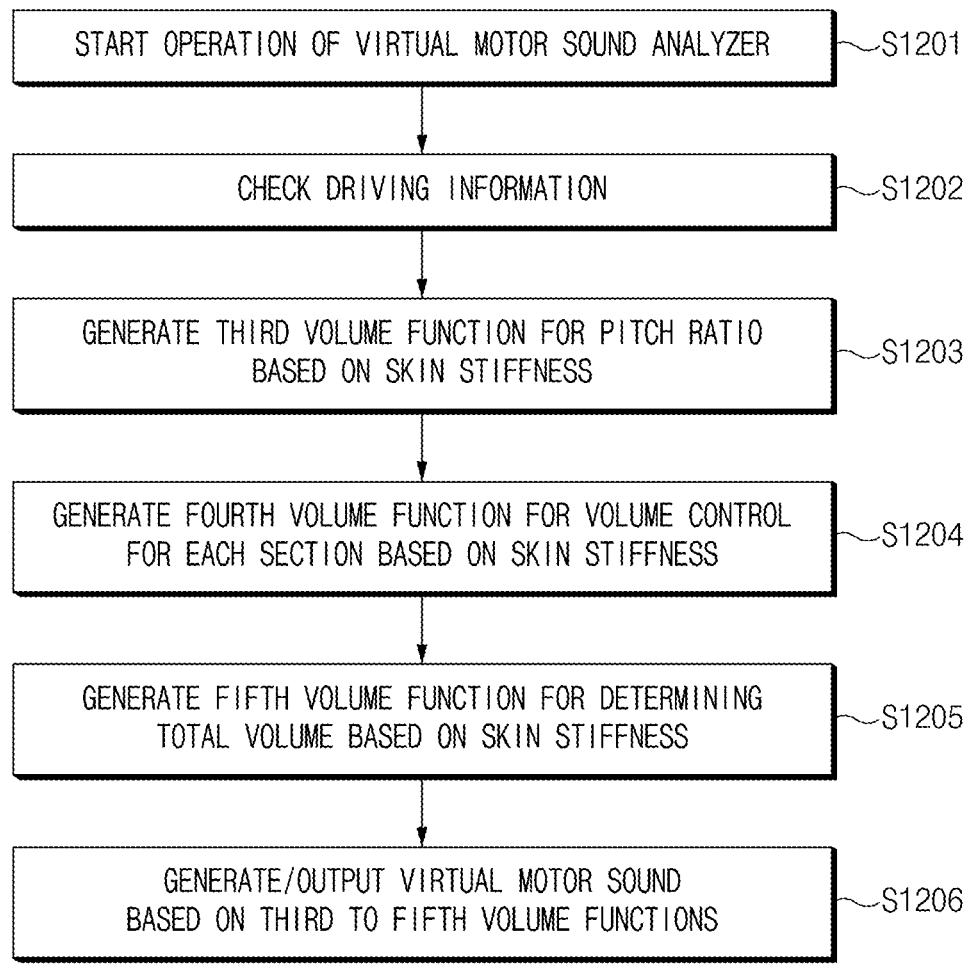
FIG. 12 is a flowchart illustrating a method of controlling a vehicle according to various exemplary embodiments of the present disclosure.

FIG. 12 is a flowchart illustrating a method of controlling a vehicle according to various exemplary embodiments of the present disclosure. FIG. 12 illustrates an example of outputting a virtual motor sound when a vehicle is an electric vehicle, and may correspond to procedures after S1201 shown in FIG. 10.

In S1201, the processor 300 may start the operation of the virtual motor sound analyzer 332 to output the virtual motor sound.

In S1202, the processor 300 may check driving information.

The processor 300 may obtain driving information including at least one of the RPM of the driving motor, the torque of the driving motor, the vehicle speed, and the accelerator pedal opening amount through the CAN communication device 339.

In S1203, the processor 300 may be configured to generate a third volume function for varying a pitch ratio based on the skin stiffness. In S1204, the processor 300 may be configured to generate a fourth volume function for volume control for each section based on the skin stiffness.

The third volume function and the fourth volume function may be used to adjust the pitch ratio of the reference virtual motor sound and the volume for each section, respectively. The reference virtual motor sound may be preset.

Hereinafter, a method of generating the third volume function and the fourth volume function will be described with reference to FIG. 13.

Figure 13A:
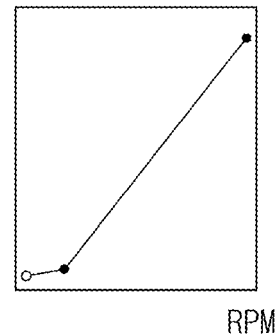
FIG. 13A and FIG. 13B are diagrams illustrating a method of generating the third volume function and the fourth volume function.
Figure 13B:
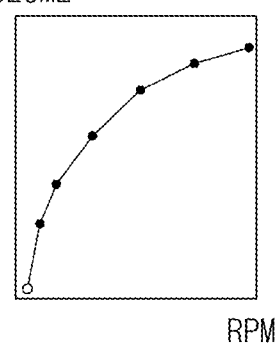

FIG. 13A and FIG. 13B are diagrams illustrating a method of generating the third volume function and the fourth volume function. FIG. 13A is a diagram illustrating an example of the third volume function, and FIG. 13B is a diagram illustrating an example of the fourth volume function.

Referring to FIG. 13A, the third volume function may be a function for determining a pitch ratio of a reference virtual motor sound according to RPM. The pitch may refer to an interval at which identical or very similar patterns are repeated in a voice signal, and adjusting a pitch ratio may be interpreted as adjusting a frequency at which the reference virtual motor sound is reproduced. For example, the processor 300 may reproduce the reference virtual motor sound at the reference frequency at 1000 rpm, increase the frequency by 1.2 times at 2000 rpm, and increase the frequency by 1.4 times at 3000 rpm.

According to an exemplary embodiment of the present disclosure, the processor 300 may increase a pitch rate change ratio of the reference virtual motor sound according to the skin stiffness. That is, the processor 300 may adjust the slope of the RPM-pitch ratio graph shown in FIG. 13A. For example, the processor 300 may increase the pitch ratio change as the skin stiffness increases, and may increase the slope of the RPM-pitch ratio graph. When the skin stiffness increases, the processor 300 may alleviate the skin stiffness of the driver by generating a dynamic and intense high-frequency virtual engine sound.

Referring to FIG. 13B, the fourth volume function may be a function for determining the volume of the reference virtual motor sound for each RPM section. The reference virtual motor sound may be reproduced differently in volume according to the RPM section. For example, the reference virtual motor sound may be reproduced at a low volume when the RPM is low, and may be reproduced at a high volume when the RPM is high.

According to an exemplary embodiment of the present disclosure, the processor 300 may be configured to generate the fourth volume function in which the volume of a specific section is adjusted according to the skin stiffness. For example, as the skin stiffness is higher, the driver's auditory stimulation may be reduced and comfort may be provided to the driver by reducing the volume in the high RPM section.

In S1205, the processor 300 may be configured to generate a fifth volume function for determining the total volume based on the skin stiffness.

The above-described fourth volume function may be a volume adjusted for a specific RPM section, but the fifth volume function may be a volume adjusted for the entire RPM section. For example, the processor 300 may reduce the driver's auditory stimulation by reducing the overall volume as the skin stiffness increases.

The fifth volume function may vary according to driving information, and may be adjusted based on driving information of at least one of the vehicle speed, torque, and accelerator pedal opening amount.

In S1206, the processor 300 may be configured to generate a virtual motor sound based on the third volume function, the fourth volume function, and the fifth volume function.

Figure 14:
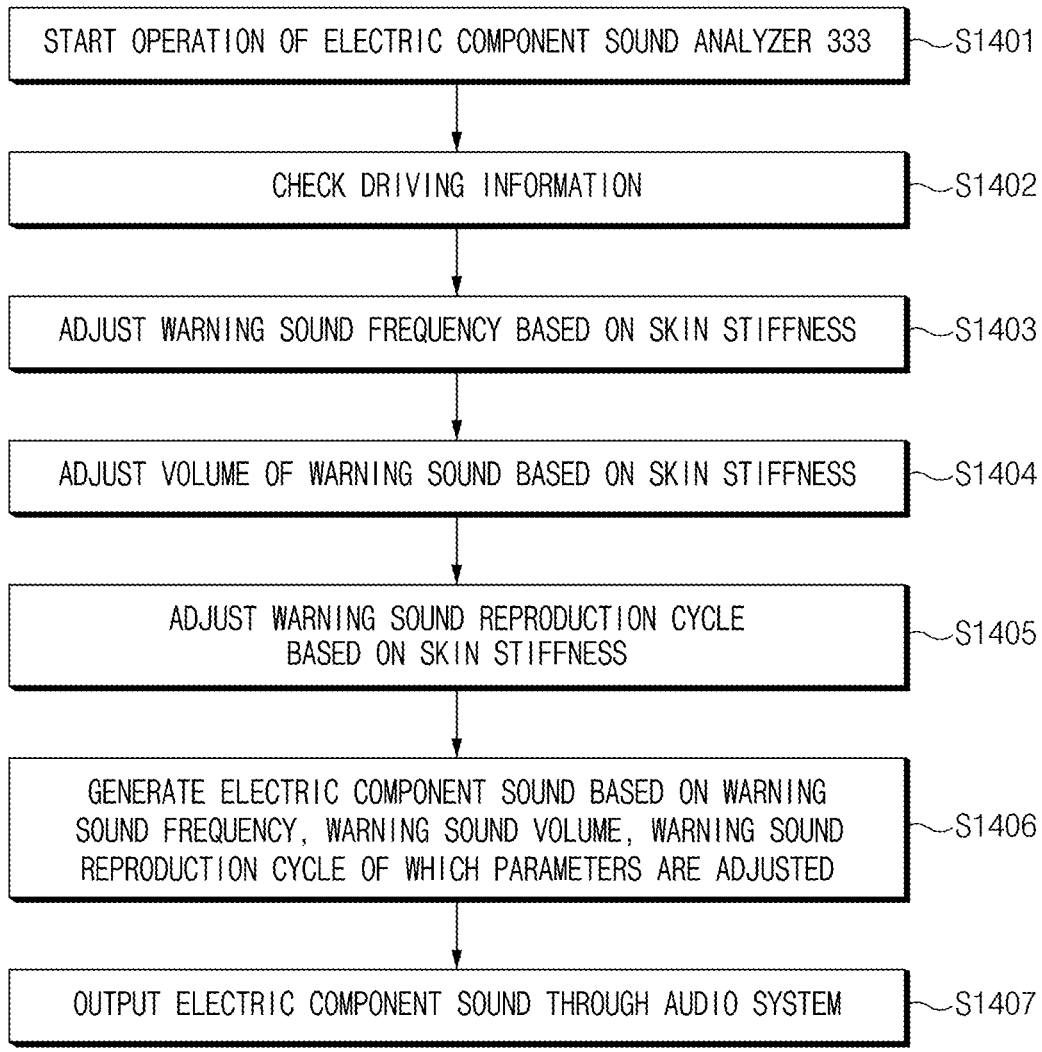
FIG. 14 is a flowchart illustrating a method of controlling a vehicle according to various exemplary embodiments of the present disclosure.

FIG. 14 is a flowchart illustrating a method of controlling a vehicle according to various exemplary embodiments of the present disclosure. FIG. 14 illustrates an example of outputting an electric component sound, and may correspond to procedures after S1401 shown in FIG. 10.

In S1401, the processor 300 may start the operation of the electric component sound analyzer 333 to output the electric component sound.

In S1402, the processor 300 may check driving information and vehicle state information. The driving information may include information such as a vehicle speed, a torque, an accelerator pedal opening amount, and the like. The vehicle state information may be information indicating a vehicle state, and may be confirmed by a user input for vehicle manipulation. The vehicle state information may include information such as whether a seat belt is worn, whether a turn signal lamp is operated, whether a horn sound is operated, and the like.

In S1403, the processor 300 may adjust a warning sound frequency based on the skin stiffness. The warning sound may include a seat belt warning sound, a direction indicator operation sound, and the like.

For example, the processor 300 may increase the frequency of the warning sound as the skin stiffness is lower.

In S1404, the processor 300 may adjust the volume of the warning sound based on the skin stiffness.

For example, the processor 300 may set the volume of the warning sound higher as the skin stiffness is lower so that the driver feels more alert.

In S1405, the processor 300 may adjust a warning sound reproduction cycle based on the skin stiffness.

For example, the processor 300 may make the driver feel more alert by shortening the reproduction cycle of the warning sound as the skin stiffness is lower.

In S1406 and S1407, the processor 300 may be configured to generate an electric component sound with adjusted parameters and output the electric component sound through the speaker 409.

Figure 15:
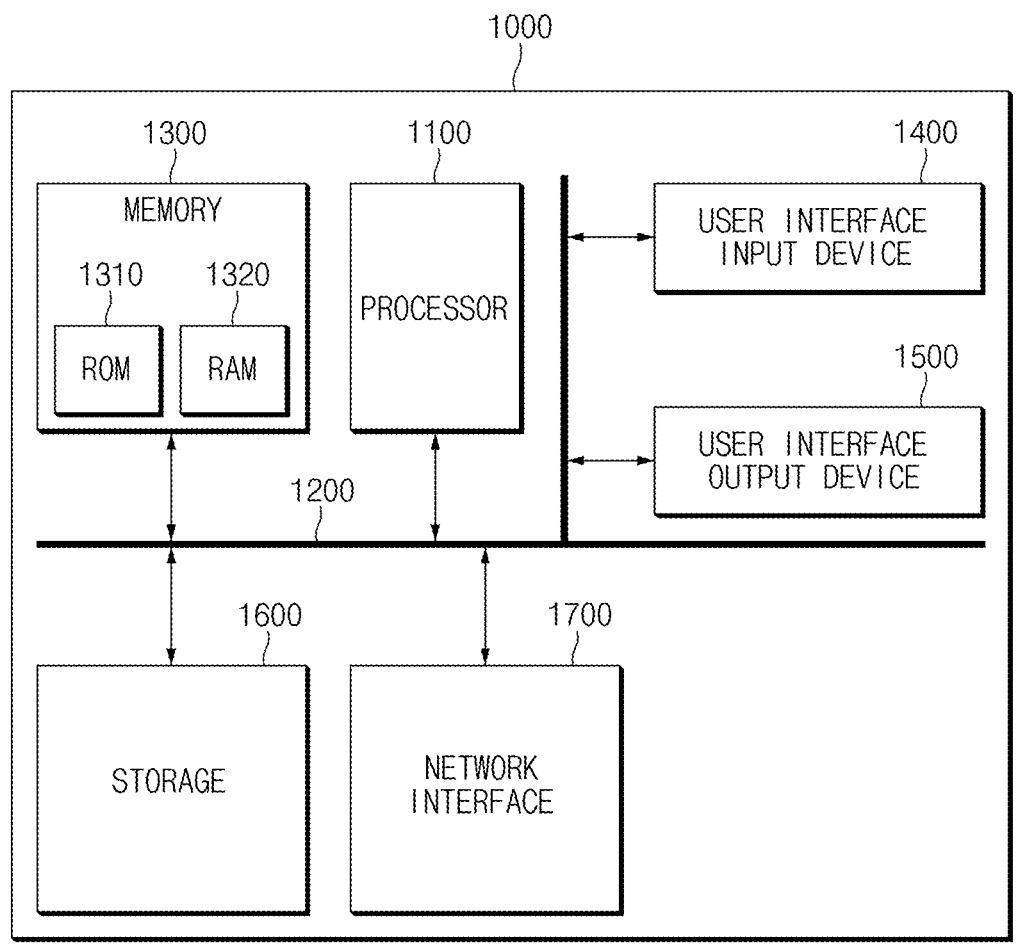
FIG. 15 is a diagram illustrating a computing system according to an exemplary embodiment of the present disclosure.

FIG. 15 illustrates a computing system according to an exemplary embodiment of the present disclosure.

Referring to FIG. 15, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) and a Random Access Memory (RAM).

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an exemplary embodiment of the present disclosure, a driving sound such as a virtual engine sound, a virtual motor sound, or the like may be adjusted based on the driver's skin stiffness, so that the driver's wakefulness may be maintained while preventing the driver from being drowsy.

Furthermore, according to an exemplary embodiment of the present disclosure, the warning sound may be adjusted based on the driver's skin stiffness, so that the driver may be notified of the warning situation more effectively.

Furthermore, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle, the apparatus comprising:
   an air injector configured to inject air at a preset target pressure to a driver of the vehicle;
   an ultrasonic transducer configured to transmit an ultrasonic wave to the driver and receive an echo of the ultrasonic wave; and
   a processor operatively connected to the ultrasonic transducer and configured to:
      determine a skin stress of the driver based on the target pressure,
      determine a skin strain of the driver based on the echo,
      determine a skin stiffness of the driver based on the skin stress and the skin strain, and
      generate a vehicle sound by use of a volume function generated based on the skin stiffness.

2. The apparatus of claim 1, wherein the processor is further configured to:
   determine a measured elastic modulus based on the skin stress and the skin strain, and
   determine the skin stiffness based on the measured elastic modulus and a previously obtained reference elastic modulus.

3. The apparatus of claim 1, wherein the processor is further configured to generate a volume function for determining a virtual engine sound based on driving information including at least one of revolutions per minute (RPM) of an engine, a torque of the engine, a vehicle speed, or an accelerator pedal opening amount and the skin stiffness.

4. The apparatus of claim 3, wherein the processor is further configured to generate a first volume function for determining a volume according to the RPM of the engine based on the RPM of the engine and the skin stiffness.

5. The apparatus of claim 3, wherein the processor is further configured to generate a second volume function for determining an overall volume of the virtual engine sound based on at least one piece of information selected among the vehicle speed, the torque, and the accelerator pedal opening amount and the skin stiffness.

6. The apparatus of claim 1, wherein the processor is further configured to generate a volume function for determining a virtual motor sound based on driving information including at least one of RPM of a driving motor, a torque of the driving motor, a vehicle speed, and an accelerator pedal opening amount and the skin stiffness.

7. The apparatus of claim 6, wherein the processor is further configured to generate a third volume function for adjusting a pitch ratio of the virtual motor sound based on the RPM of the driving motor and the skin stiffness.

8. The apparatus of claim 6, wherein the processor is further configured to generate a fourth volume function for adjusting volume of each RPM section of the virtual motor sound based on the RPM of the driving motor and the skin stiffness.

9. The apparatus of claim 6, wherein the processor is further configured to generate a fifth volume function for determining an overall volume of the virtual motor sound based on at least one piece of information selected among the vehicle speed, the torque, or the accelerator pedal opening amount and the skin stiffness.

10. The apparatus of claim 1, wherein the processor is further configured to generate an electric component sound volume function for generating electric component sound based on the skin stiffness.

11. A method of controlling a vehicle, the method comprising:
    determining skin stiffness of a driver based on skin stress of the driver and a skin strain obtained based on an echo reflected by transmitting an ultrasonic wave to the driver;
    generating a volume function in which at least one of a volume, a frequency, or waveform shape is set differently based on the skin stiffness; and
    generating a vehicle sound based on the volume function.

12. The method of claim 11, wherein the determining of the skin stiffness includes:
    determining, by a processor, the skin strain by injecting air of a preset target pressure to the driver;
    transmitting, by the processor, the ultrasonic wave to the driver to determine the skin strain based on the echo of the returned ultrasonic wave;
    determining, by the processor, a measured elastic modulus based on the skin stress and the skin strain; and
    determining, by the processor, a skin stiffness based on the measured elastic modulus and a previously obtained reference elastic modulus.

13. The method of claim 11, further including:
    obtaining, by the processor, driving information including at least one of revolutions per minute (RPM) of an engine, a torque of the engine, a vehicle speed, or an accelerator pedal opening amount,
    wherein the generating of the volume function includes generating a volume function for determining a virtual engine sound based on the driving information and the skin stiffness.

14. The method of claim 13, wherein the generating of the volume function includes:
    generating a first volume function for determining a volume according to the RPM of the engine based on the RPM of the engine and the skin stiffness.

15. The method of claim 13, wherein the generating of the volume function includes:
    generating a second volume function for determining an overall volume of the virtual engine sound based on at least one piece of information selected among the vehicle speed, the torque, and the accelerator pedal opening amount and the skin stiffness.

16. The method of claim 11, further including:
    obtaining, by the processor, driving information including at least one of RPM of a driving motor, a torque of the driving motor, a vehicle speed, and an accelerator pedal opening amount,
    wherein the generating of the volume function includes generating a volume function for determining a virtual motor sound based on the driving information and the skin stiffness.

17. The method of claim 16, wherein the generating of the volume function includes:
    generating a third volume function for adjusting a pitch ratio of the virtual motor sound based on the RPM of the driving motor and the skin stiffness.

18. The method of claim 16, wherein the generating of the volume function includes:
    generating a fourth volume function for adjusting volume of each RPM section of the virtual motor sound based on the RPM of the driving motor and the skin stiffness.

19. The method of claim 16, wherein the generating of the volume function includes:
    generating a fifth volume function for determining an overall volume of the virtual motor sound based on at least one piece of information selected among the vehicle speed, the torque, or the accelerator pedal opening amount and the skin stiffness.

20. The method of claim 11, wherein the generating of the vehicle sound includes:

generating an electric component sound volume function for generating electric component sound based on the skin stiffness.

* * * * *